Sept. 7, 1926.  
C. H. CASPAR  
1,598,601  
PROCESS OF DEALCOHOLIZATION OF BEVERAGES AND THE LIKE  
Filed April 27, 1920
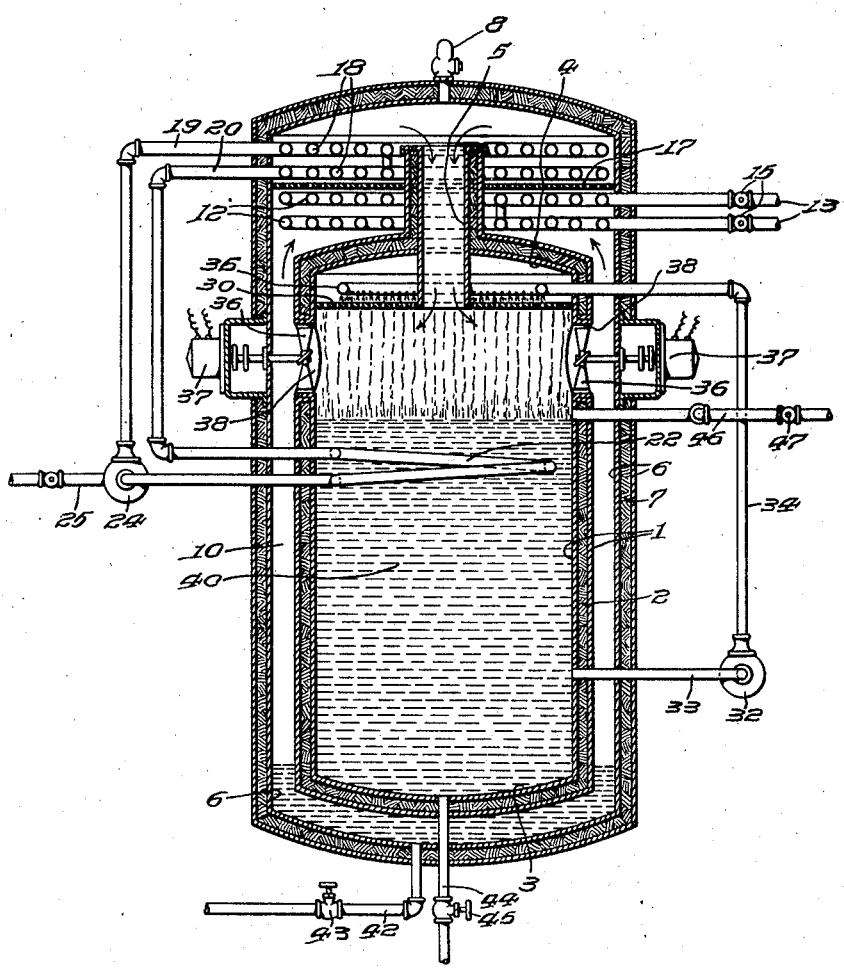
INVENTOR  
Charles H. Caspar,
WITNESS  
F. J. Hartman
BY  
ATTORNEYS Patented Sept. 7, 1926.

1,598,601

UNITED STATES PATENT OFFICE.

CHARLES H. CASPAR, OF PHILADELPHIA, PENNSYLVANIA.

PROCESS OF DEALCOHOLIZATION OF BEVERAGES AND THE LIKE.

Application filed April 27, 1920. Serial No. 376,918.

My invention relates particularly to the manufacture of non-alcoholic fermented beverages and the like, although if desired the process may be so carried out as to produce beverages containing a given percentage of alcohol, for example, one-half of one per cent or less. In the manufacture of fermented beverages, the alcohol is produced during the fermentation period, and it is the object of my invention to effect the removal of the alcohol substantially during the same period in such manner that the flavor, aroma and other properties of the beverage will not be impaired, to the end that the beverage, when in condition for consumption, will retain substantially all of the characteristics, for example, as regards taste, appearance, foam stability and the like, save those due to the presence of an alcoholic content, which are normally found in beverages produced by the ordinary processes of fermentation.

In carrying out my invention I may employ any suitable apparatus, and in the accompanying drawing I have shown one form well adapted for the purposes intended, the single figure being a vertical central section thereof with certain parts shown in elevation.

Referring to the drawing, the apparatus therein shown consists of an inner tank 1, preferably substantially in the form of a vertically positioned, elongated, double walled cylinder, the space 2 between the walls being preferably filled with heat insulating material. The tank is provided with a bottom 3 preferably curving downwardly toward the center, and a top 4 preferably curving upwardly toward its center and provided with a central upwardly extending neck 5 of an internal diameter considerably less than that of the body of the tank. The tank is completely surrounded by and contained within a preferably double walled casing 6 having insulating material 7 within its walls. This outer casing may preferably be provided with a pressure regulating and relief valve 8, and is maintained in upright position by suitable supporting means (not shown), while the tank 1 is rigidly supported within the casing by suitable supporting means (not shown) and spaced from the inner walls thereof so that an air space or chamber 10 is formed between the tank and the casing.

Located above the top 4 of the tank and within the casing 6 are a plurality of cooling coils 12 connected by the pipes 13, which pass through the casing 6, with suitable means (not shown) for maintaining the coils at a given temperature by the circulation of a suitable cooling medium therein, valves 15 positioned in the pipes serving to regulate the flow of the cooling medium therethrough.

Above the coils 12 may be located a foraminous baffle plate 17 surrounding the neck 5 and extending to the wall of the outer casing, and above this baffle plate are positioned other coils 18 from which the inlet and outlet pipes 19 and 20 extend outwardly through the casing. These pipes are in turn connected with a cooling coil 22 positioned within the tank 1, and a pump 24 is suitably located and connected in the pipes in such manner as to effect a circulation of cooling fluid therein, which fluid may be replenished when necessary from a suitable reservoir (not shown) and connected to the pump by the pipe 25.

Positioned adjacent the upper end of the tank 1 and extending entirely across the same is a foraminous diffusing plate or pan 30, the inner wall of the neck 5 being continued downwardly to meet the pan which is provided with a suitable central aperture for the reception thereof, and for the purpose of maintaining a circulation of fluid from the lower part of the tank to a point above the pan, a pump 32 is conveniently positioned exterior of the outer casing and connected by a pipe 33 with the interior of the lower part of the tank and by a pipe 34 with a perforated ring or other diffusing means 35 positioned within the tank and above the pan, so that liquid pumped from the tank will be carried up and discharged above the pan, through which it descends in finely divided form to return to the main body of liquid within the tank.

For the purpose of causing a circulation of gas and vapor from a point above the main body of the liquid contained in the tank, over the cooling coils 12, upwardly through the baffle plate, over the coils 18 and thence downwardly through the neck, one or more fans 36, each preferably driven by a motor 37, is positioned in suitable openings 38 in the walls of the tank at a point somewhat above the level at which the liquid 40 is maintained during the carrying out of the process, and for the purpose of drawing off the alcohol which, after condensation in a manner hereinafter described, collects in the bottom of the casing 6 in the form of low wines, the casing is provided with a drain pipe 42 controlled by a valve 43 and connected with any suitable receiver (not shown). Similarly, the tank 1 is also provided with a drain pipe 44 controlled by a valve 45, as well as an inlet pipe 46 controlled by a valve 47, through which the liquid may be introduced into the tank.

In carrying out my process with an apparatus of substantially the character of that just described, I first introduce into the tank a suitable quantity of worts or other fermentable liquid to which yeast or other fermentation inducing material has been added to effect fermentation in the ordinary, well known manner, the worts or other liquid being, for example, at an initial temperature of substantially 48° F. As the fermentation proceeds, the liquid tends to rise in temperature, which action is checked and the temperature maintained substantially constant by suitable manipulation of the pump 24 to effect a circulation of the cooling medium in the coil 22 positioned in the body of the liquid. At the same time, the fans 36 are started, as well as the pump 32, which latter serves to pump the liquid to a point above the diffusing pan 30, where it is discharged and percolates downwardly in finely divided form through the space above the main body of the liquid and through which a circulation of the gases generated by the fermentation is being constantly effected by the rotation of the fans. Through the contact of the finely divided liquid with the gases and vapors, the latter become charged with moisture of largely alcoholic character, substantially to a point of saturation, and as they are carried upwardly over the cooling coils 12, which are kept at a suitable relatively low temperature, as for example, 30° F., they are chilled sufficiently to precipitate or condense out a considerablle part of the alcoholic content, which runs down over the exterior of the tank and collects in the bottom of the casing in the form of low distilled spirits. The gases and vapors, after contact with the cooling coils, pass upwardly through the baffle plate and over the coils 18, which, being higher in temperature than the cooling coils, serve to re-expand the gases and vapors which thereafter pass downwardly through the neck and again repeat their cycle, the process being continued until all, or any desired quantity, of the alcohol has been extracted from the liquid, after which the latter is withdrawn from the tank and subjected to such further treatment as may be desired to reduce the finished beverage.

It will be understood that the pressure within the apparatus during the carrying out of the process may be controlled by suitable manipulation of the valve 8, and the extent to which the liquid is charged with $CO_2$ at the termination of the process will be in large measure dependent upon the degree of pressure which has been maintained as aforesaid. Furthermore, it is desirable at the initiation of the fermentation to drive off from the interior of the casing, all, or a considerable portion, of the contained air, an operation which may be readily effected by leaving the pressure valve open until fermentation has proceeded sufficiently to displace the air by the generated $CO_2$.

It will be further understood that while I prefer, as stated, to maintain the worts or other liquid substantially at a temperature of 48° F. during the carrying out of the process and to maintain the cooling coils 12 at a considerably lower temperature in order to effect the desired condensation of the alcohol with sufficient rapidity, I may, if desired, vary the temperatures from the figures stated by way of example so long as the temperature of the worts or other liquid is maintained within those limits at which fermentation can occur and the coils at a temperature at which the requisite condensation of the alcohol is effected in the passage of the gas and other vapors over the coils.

Hence, by the use of the process which I have hereinbefore described and which may be employed both in production of beverages of the nature of those ordinarily obtained by brewing, as well as in the production of wines and other fermented beverages, I am enabled to remove the alcohol from the worts or other liquid during the process of fermentation without subjecting the same to ebullition either under atmospheric or reduced or excess pressures, and am thus enabled to conserve the natural properties of the liquid, and thereby produce beverages having substantially all the characteristics, save those arising from the presence of alcohol, inherent in beverages hitherto produced by the ordinary processes of fermentation and which are therefore not different in taste, appearance, color or foam-stability therefrom.

Having thus described my invention, I claim and desire to protect by Letters Patent of the United States:

1. The step in the process of producing a fermented beverage, which consists in effecting alcoholic fermentation, causing a circulation of the fermenting liquid through the gases and vapors generated by fermentation, and condensing the alcohol from said gases and vapors while maintaining the temperature of the liquid at a point less than that at which ebullition occurs.

2. The step in the process of producing a fermented beverage, which consists in maintaining alcoholic fermentation in a liquid at substantially the temperature of fermentation, causing a circulation of said liquid through the gases and vapors generated by fermentation, cooling said gases and vapors to effect condensation of the alcoholic content thereof, heating said gases and vapors, again bringing them in contact with said liquid and continuing said operation until the desired quantity of alcohol has been removed from the liquid.

3. The method of removing alcohol from a liquid undergoing alcoholic fermentation during its period of fermentation by bringing the liquid into intimate contact with the gases generated by the fermentation, cooling said gases to effect condensation, raising the temperature of said gases to substantially their initial temperature, and again bringing them into contact with the liquid while maintaining the liquid at a temperature within the range in which fermentation will occur and below that sufficient to cause ebullition at the pressure to which the liquid is subjected.

In witness whereof, I have hereunto set my hand this 26th day of April, 1920.

CHARLES H. CASPAR.